US006576283B2

(12) United States Patent
Hashimoto et al.

(10) Patent No.: US 6,576,283 B2
(45) Date of Patent: Jun. 10, 2003

(54) PRODUCTION PROCESS FOR DRINKS

(75) Inventors: Tadashi Hashimoto, Setagaya-ku (JP);
Shigeo Shinkawa, Yokohama (JP);
Yoshinobu Hayakawa, Yokohama (JP);
Tomoe Sakata, Yokohama (JP)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 10/223,001

(22) Filed: Aug. 19, 2002

(65) Prior Publication Data

US 2003/0008055 A1 Jan. 9, 2003

Related U.S. Application Data

(63) Continuation of application No. 09/638,956, filed on Aug. 16, 2000, now abandoned.

(30) Foreign Application Priority Data

Aug. 17, 1999 (JP) ............................................ 11-230438

(51) Int. Cl.[7] .................................................. A23G 1/00
(52) U.S. Cl. ........................ 426/584; 426/580; 426/590; 426/594; 426/597; 426/521; 426/522
(58) Field of Search ................................. 426/520, 521, 426/522, 580, 584, 590, 594, 597, 655

(56) References Cited

U.S. PATENT DOCUMENTS 5,993,877 A    11/1999   Ohtake

FOREIGN PATENT DOCUMENTS

| DE | 31 41 319 | 4/1983 |
|---|---|---|
| EP | 0 095 202 | 11/1983 |
| EP | 0 546 200 | 6/1993 |
| EP | 0 769 250 | 4/1997 |
| GB | 857699 | 1/1961 |
| JP | 10-304823 | 11/1998 |

OTHER PUBLICATIONS

Kinugasa et al., AN 382030 Frosti, abstracting JP 06311846, 1994.

Clem Honer, "Flavor Puzzle", Dairy Field, XP–000964611, vol. 177, No. 3, p. 62, Mar. 1994.

Anonymous, XP–002152786, vol. 5, No. 4, pp. 40–42 and 44, 1993.

*Primary Examiner*—Leslie Wong
(74) *Attorney, Agent, or Firm*—Wenderoth, Lind & Ponack, L.L.P.

(57) ABSTRACT

A drink component thermally sterilized and flavors which has been removed of microorganism by filtration are formulated under aseptic conditions, and a mixture obtained is filled into containers. Milk-containing soft drinks are produced by a process including obtaining a first drink component containing milk and an emulsifier, sterilizing the first drink component at a high temperature and cooling the same, obtaining a second drink component not containing milk, sterilizing the second drink component at a high temperature and cooling the same, obtaining a flavor component removed of microorganism by filtration, and blending the cooled first drink component and the cooled second drink component under aseptic conditions.

3 Claims, 7 Drawing Sheets

PRODUCTION PROCESS FOR DRINKS

This application is a continuation application of Ser. No. 09/638,956, filed Aug. 16, 2000 now abandoned.

FIELD OF INVENTION

The present invention relates to a production process for drinks, and more particularly to a production process for drinks with excellent taste and flavor.

BACKGROUND OF THE INVENTION

Since milk-containing soft drink contains microbiologically rich nourishment, its sterilization is generally performed under severe conditions, for example, those equivalent to 121° C. for 20–30 minutes.

Commercial soft drink products containing milk have been conventionally sterilized after formulation by blending extracted ingredients, etc. with a milk component. Severe sterilization conditions have been adopted which are equivalent to 121° C. for 20–30 minutes. Thus, the original flavors and tastes of extract components, etc. have been significantly lost in these products.

For example, coffee drinks are formed from a liquid coffee extract, a milk component, a pH adjusting agent, an anti-oxidant, a sweetener, a flavor, etc. The product has been produced by blending these components, and thermally sterilizing a mixture obtained, and filling into sterilized containers. Severe sterilizing conditions have been adopted in compliance with food health regulations, and thus, the original aromatic flavors and tastes of the drink materials have been degraded, and the damage to flavors has been particularly significant.

For examples, various flavors are used in such coffee drinks, including naturally derived flavors and chemically synthetic flavors, but the essential components for coffee flavor, for example, furfuryl mercaptan and methional, can be are significantly lost upon heating. Thus, a remarkable decrease in the aromatic flavor is caused by said heating for sterilization after flavors have been added.

In consideration of such situations, a proposal has been made to produce container-filled drinks by blending a coffee component, which has been removed of microorganism by filtration, with a thermally sterilized milk component, and filling a mixture obtained into sterilized containers. (Refer to Japanese Laid-Open Patent Application Hei-10 (1998)-304823.)

This process, however, has been found not necessarily satisfactory in respect to the retention of coffee taste to a satisfactory degree.

Namely, the present inventor has found that, when a liquid coffee extract is filtered for the removal of microorganism, components of the liquid coffee extract, which are essential to original coffee flavor, are also removed during the filtration for the removal of microorganism, and thus, the original coffee taste becomes significantly deteriorated.

The explanation has been made in respect to coffee drinks, but the same can be true with not only coffee drinks but also various other drinks, of which tastes and flavors are important factors, such as black tea drinks, green tea drinks, fruit juices, etc.

Accordingly, an object of the present invention is to provide a production process for novel tasty drinks which are retaining their original tastes and flavors.

SUMMARY OF THE INVENTION

According to the present invention, a production process for milk-contained soft drink is provided, which comprises mixing and emulsifying a milk component containing milk and an emulsifier to obtain a first drink component, sterilizing the first drink component at a high temperature under a first condition and cooling the same, obtaining a second drink component not containing a milk component, sterilizing the second drink component at a high temperature under a milder condition than the first condition and cooling the same, blending the cooled first drink component and the cooled second drink component under an aseptic condition to produce milk-contained soft drink.

According to the present invention, a first drink component containing a milk component and a second drink component not containing a milk component are handled independently, and the first drink component is sterilized under a sterilization condition equivalent to 121° C. for 20–30 minutes, for example, at 138° C. for 30 seconds, which is as severe as a conventional condition, while the second drink component is sterilized under a sterilization condition equivalent to 121° C. for 5 minutes, for example, at 131° C. for 30 seconds in order to suppress the thermal degradation of the flavor and taste of coffee or black tea contained in the second drink component. Accordingly, a milder condition in high temperature sterilization means, for example, a lower heating temperature and/or a shorter heating times.

Furthermore, in order to solve said problem, a production process for container-filled drinks is provided according to the present invention, which comprises blending, under an aseptic condition, a thermally sterilized beverage component and a flavor which has been removed of microorganism by filtration, and filling a mixture obtained into containers.

Furthermore, in order to solve said problem, a production process for milk-containing soft drinks is provided according to the present invention, which comprises mixing and emulsifying milk and an emulsifier-containing milk component to obtain a first drink component, sterilizing the first drink component at a high temperature under a first condition and cooling the same, obtaining a second drink component not containing a milk component, sterilizing the second drink component at a high temperature under a milder condition than the first condition and cooling the same, obtaining a third drink component containing a flavor removed of microorganism by filtration, blending, under an aseptic condition, the cooled first drink component, the cooled second drink component and the third drink component for the manufacture of milk-containing soft drink.

According to the present invention, a milk component and other beverage components are independently handled, sterilization is performed in appropriate manners for respective components so that the flavor and taste of coffee or black tea may be prevented from deterioration. Also by combining a process according to the present invention with a process wherein all the steps from extraction to filling are performed in the absence of oxygen, the deterioration is suppressed to a minimum and original flavors and tastes of raw materials may be further preserved.

Furthermore, according to the present invention, the flavor deterioration caused by the conventional method of thermal sterilization can be prevented by the adoption of a method by removing microorganism by filtration, that is, without heating, and thus, the original flavors and tastes of raw materials for a drink can be preserved.

Also, by combining a process according to the present invention with a process wherein all the manufacturing steps are performed in the absence of oxygen, the deterioration is suppressed to a minimum, and the original flavors and tastes of raw materials for drinks may be further preserved.

DESCRIPTION OF THE PREFERRED EMBODIMENTS AND COMPARATIVE EXAMPLES

EXAMPLE 1

Figure 1:
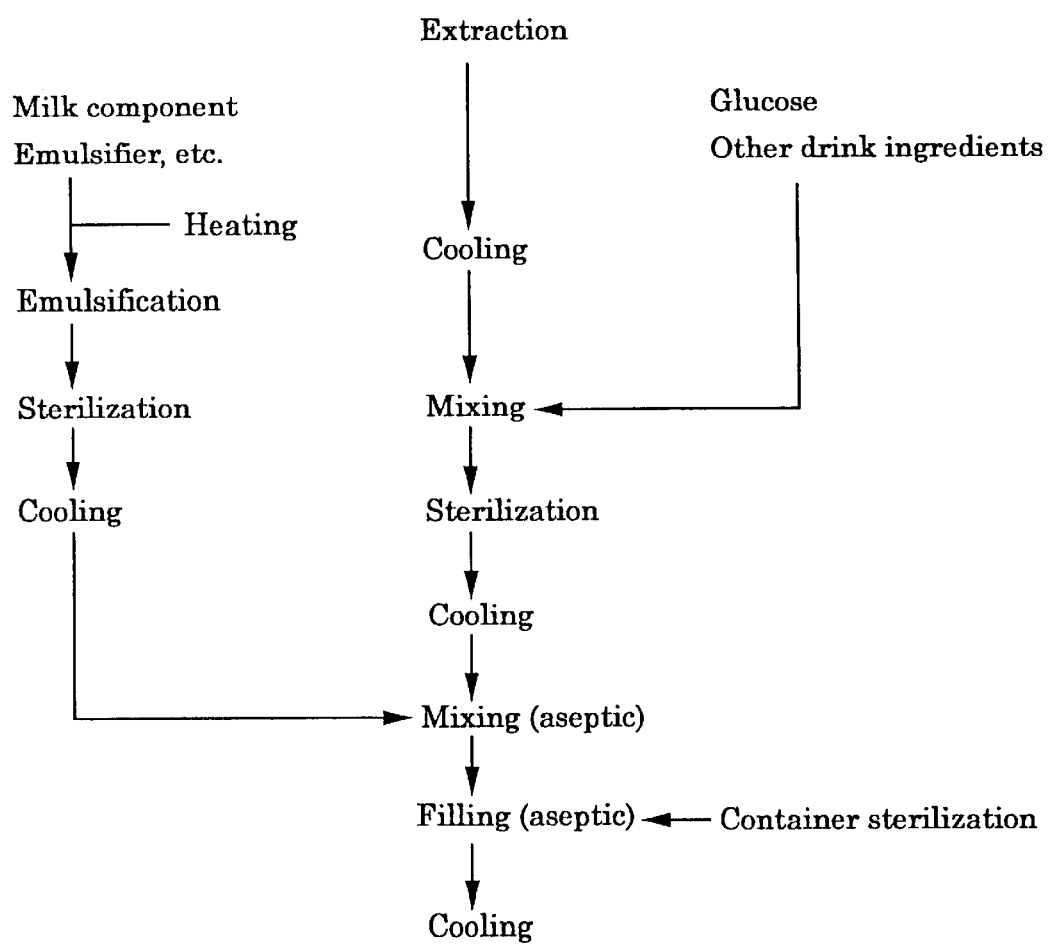
FIG. 1 is a flow diagram showing steps of a production process for milk-containing soft drinks according to Examples 1 and 2 of the present invention.

In accordance with a production process as shown in FIG. 1, a liquid coffee extract (that is, coffee solids) was obtained according to a known method, sugar and a pH adjusting agent were added according to the formula shown in Table 1, and a mixture obtained was subjected to sterilization at 131° C. for 30 seconds (to make a first drink component). Independently from the first drink component, a milk component containing an emulsifier, etc. was dissolved and emulsified, and subsequently an emulsion obtained was subjected to sterilization at 138° C. for 30 seconds (to make a second drink component). Next, after the first and second drink components were formulated by mixing together in an aseptic tank, a mixture obtained was filled into pre-sterilized containers under aseptic conditions to obtain a drink.

TABLE 1

| Formula for Coffee Drink | |
| --- | --- |
| Coffee beans | 50.0 kg |
| (Coffee solids | 12.5) |
| Sugar | 50.0 |
| Milk component | |
| Fresh milk | 80.0 |
| Emulsifier | 2.0 |
| pH Adjustment agent and Water | optional |
| Total | 1000.0 L |
| | Brix 7.0% |
| | pH 6.5 |

COMPARATIVE EXAMPLE 1

Figure 2:
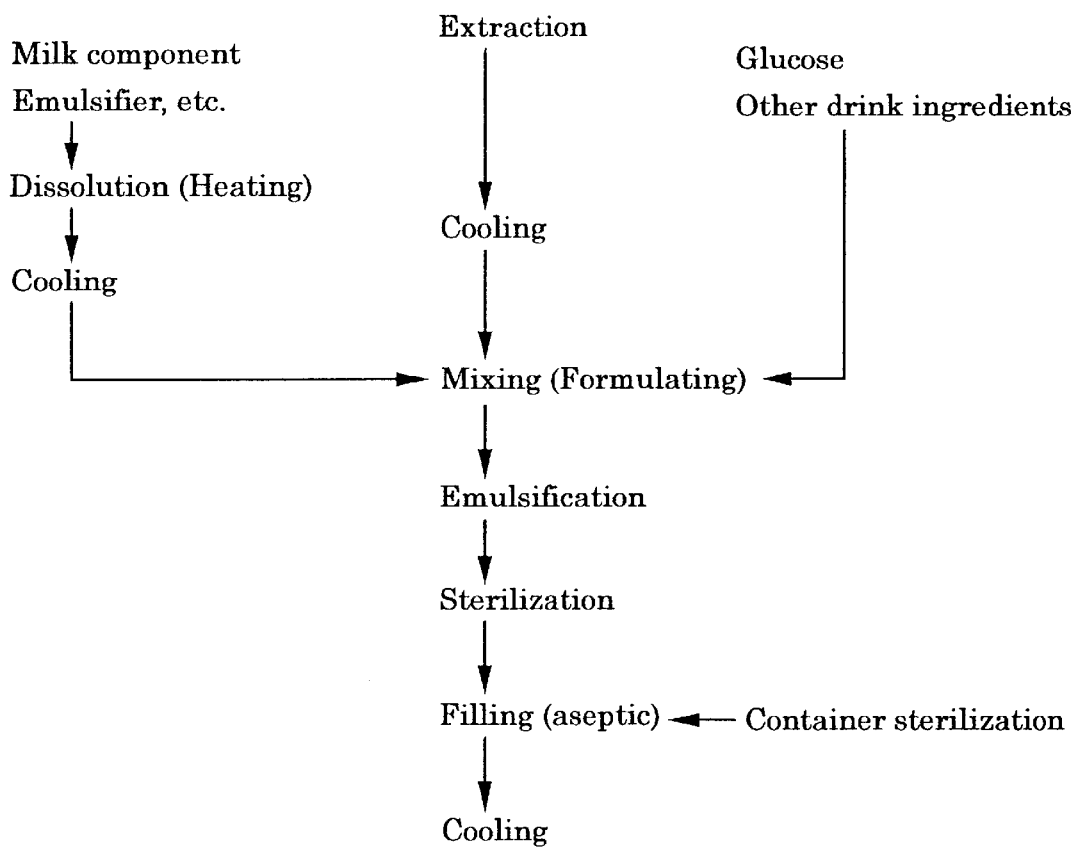
FIG. 2 is a flow diagram showing steps of a production process for milk-containing soft drinks according to Comparative Examples 1 and 2 of prior art.

In accordance with a production process as shown in FIG. 2, a liquid coffee extract (that is, coffee solids) was obtained according to a publicly known method, sugar and a milk component containing a pH adjusting agent, an emulsifier, etc. were added according to the formula shown in Table 1 and formulated by mixing, and an emulsion was formed, then subjected to sterilization at 138° C. for 30 seconds, and subsequently filled into pre-sterilized containers under aseptic conditions to obtain a drink.

The drinks obtained in Example 1 and Comparative Example 1 were served to taste sampling by 10 panelists of coffee specialists, and the test resulted in a finding that the drink obtained in Comparative Example 1 had lost more of the original coffee flavor and taste than the drink obtained in Example 1, as shown in Table 2.

TABLE 2

| Taste Sampling of Coffee Drinks | | |
| --- | --- | --- |
| | Average marks | |
| | Example 1 | Comparative Example 1 |
| General mark | 4.3 | 3.5 |
| Flavor | 4.5 | 3.2 |
| Taste | 4.5 | 3.5 |
| Bitterness | 3.0 | 3.0 |
| Aftertaste | 4.5 | 3.5 |

Ratings: General marking:
Flavor, taste and aftertaste: [Good] 5 ← → 1 [Bad]
Bitterness: [Strong] 5 ← → 1 [Weak]

EXAMPLE 2

In accordance with a production process as shown in FIG. 1, a liquid black tea extract (that is, black tea solids) was obtained according to a known method, sugar and a pH adjusting agent were added according to the formula shown in Table 3, a mixture obtained was subjected to sterilization at 131° C. for 30 seconds (to make a third drink component). Independently from the third drink component, a milk component containing an emulsifier, etc. was dissolved and emulsified, and subsequently an emulsion obtained was subjected to sterilization at 138° C. for 30 seconds (to make a fourth drink component). Next, after the third and fourth drink components were formulated by mixing together in an aseptic tank, a mixture formulated was filled into pre-sterilized containers under aseptic conditions to obtain the drink.

TABLE 3

| Formula for Black Tea Drink | |
| --- | --- |
| Black tea leaves | 6.0 kg |
| (Black tea solids | 2.0) |
| Sugar | 60.0 |
| Milk component | |
| Fresh milk | 100.0 |
| Emulsifier | 1.5 |
| Sodium citrate | 0.6 |
| Water | optional |
| Total | 1000.0 L |
| | Brix 7.5% |
| | pH 6.8 |

COMPARATIVE EXAMPLE 2

In accordance with a production process as shown in FIG. 2, a liquid black tea extract (that is, black tea solids) was obtained according to a publicly known method, sugar and a milk content containing a pH adjusting agent, an emulsifier, etc. were added according to the formula shown in Table 3 and formulated by mixing, and an emulsion was then formed, subjected to sterilization at 138° C. for 30 seconds, and subsequently filled into pre-sterilized containers under aseptic conditions to obtain the drink.

Drinks obtained in Example 2 and Comparative Example 2 were served to taste sampling by 10 panelists of black tea specialists, and the test resulted in a finding that the drink obtained in Comparative Example 2 had lost more of the original black tea flavor and taste than the drink obtained in Example 2, as shown in Table 4.

TABLE 4

Taste Sampling of Black Tea Drink

| | Average marks | |
|---|---|---|
| | Example 2 | Comparative Example 2 |
| General mark | 4.5 | 3.5 |
| Flavor | 4.2 | 3.5 |
| Taste | 4.2 | 3.6 |
| Astringency | 3.5 | 3.3 |
| Aftertaste | 4.6 | 3.5 |

Ratings: General marking:
Flavor, taste and aftertaste: [Good] 5 ← → 1 [Bad]
Astringency: [Strong] 5 ← → 1 [Weak]

EXAMPLE 3

Figure 3:
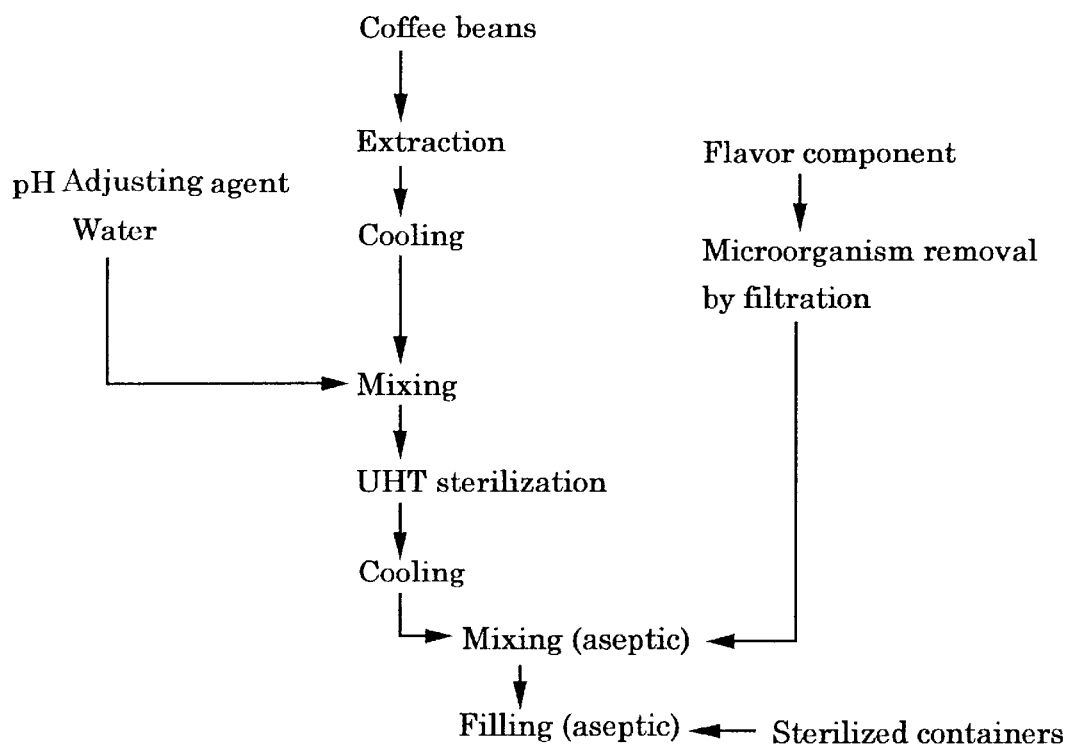
FIG. 3 is a flow diagram showing steps of a production process for drinks according to Example 3 of the present invention.

In accordance with a production process as shown in FIG. 3, a liquid coffee extract (coffee solids) was obtained after a known method, a pH adjusting agent was added according to the formula shown in Table 5, a mixture obtained was subjected to sterilization at 131° C. for 30 seconds (to make a fifth drink component). Independently from the fifth drink component, a flavor component was removed of microorganism by filtration through a 0.45 $\mu$m diameter-sized filter (to make a sixth drink component). Next, after the fifth and sixth components were formulated by mixing together in an aseptic tank, a mixture obtained was filled into pre-sterilized containers under aseptic conditions to obtain a drink.

TABLE 5

Formula for Coffee Drink

| Coffee beans | 50.0 kg |
|---|---|
| (coffee solids | 12.5) |
| Flavors | 1.0 |
| pH adjusting agent | optional |
| Water | optional |
| Total | 1000.0 L |
| | Brix 1.50 |
| | pH 6.50 |

COMPARATIVE EXAMPLE 3

Figure 4:
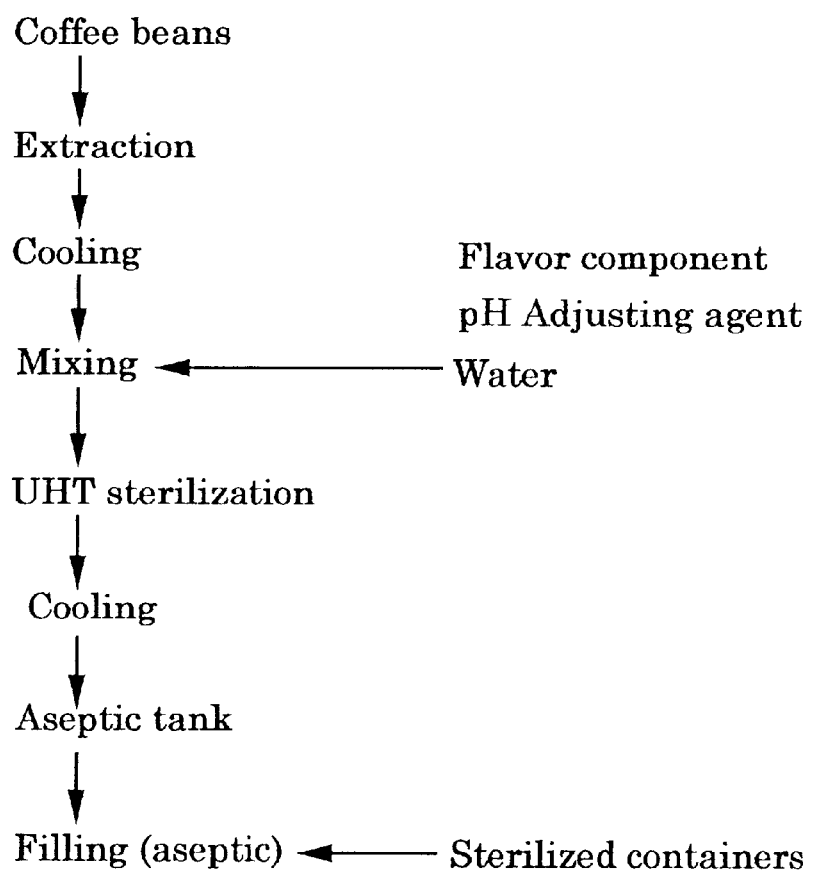
FIG. 4 is a flow diagram showing steps of a production process for drinks according to Comparative Example 3 of prior art.

In accordance with a production process as shown in FIG. 4, a liquid coffee extract (coffee solids) was obtained after a known method, a pH adjusting agent and flavors were added according to the formula shown in Table 5 and formulated by mixing, and a mixture obtained was subjected to sterilization at 131° C. for 30 seconds, and then filled into pre-sterilized containers under aseptic conditions to obtain a drink.

COMPARATIVE EXAMPLE 4

Figure 5:
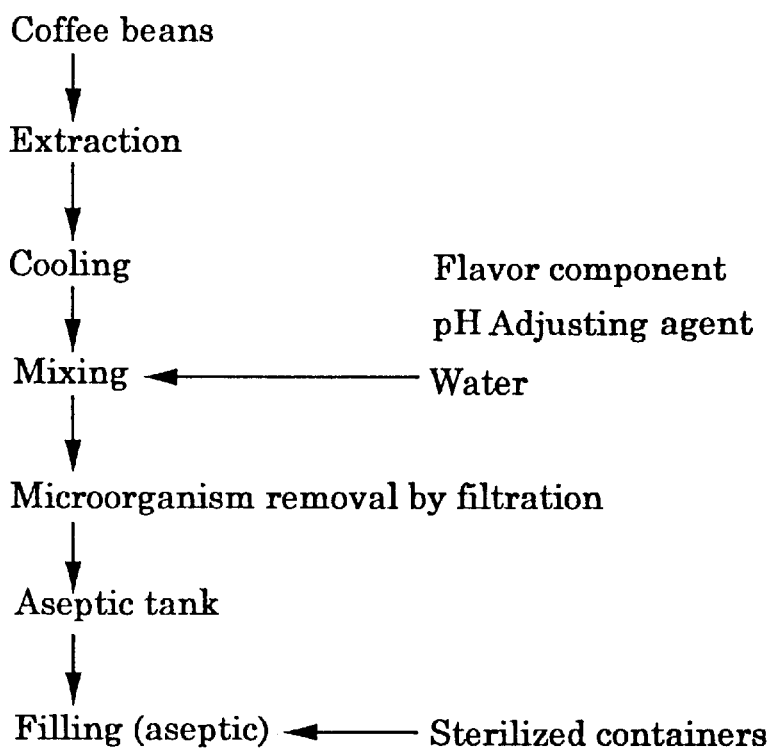
FIG. 5 is a flow diagram showing steps of a production process for drinks according to Comparative Example 4 of prior art.

In accordance with a production process as shown in FIG. 5, a coffee extract solution (coffee solids) was obtained after a known method, a pH adjusting agent and flavors were added according to the formula shown in Table 5 and formulated by mixing, and a mixture obtained was removed of microorganism by filtration through a 0.45 $\mu$m diameter-sized filter, and then filled into pre-sterilized containers under aseptic conditions to obtain a drink.

Drinks obtained in Example 3 and Comparative Examples 3 and 4 were served to taste sampling by 10 panelists of coffee specialists, and the test resulted in a finding that the drink obtained in Example 3 had a stronger flavor than that obtained in Comparative Example 3 or 4, as well as an improved taste comparable to coffee served at coffee stores (Table 6).

TABLE 6

Result of Taste Sampling

| | Average marks | | |
|---|---|---|---|
| | Example 3 | Comparative Example 3 | Comparative Example 4 |
| Consolidated evaluation | 4.5 | 3.8 | 4.0 |
| Flavor | 4.8 | 3.2 | 4.2 |
| Taste | 4.5 | 4.0 | 3.8 |
| Bitterness | 4.2 | 3.8 | 3.6 |
| Aftertaste | 4.5 | 4.2 | 4.4 |

Note (Marks): [Good] 5 ← → 0 [Bad]

In the above, the present invention has been explained in reference to Examples and Comparative Examples. However, it should not be restricted by these descriptions in any manner, but may be also applicable to any kind of drinks besides coffee drinks (including those containing milk), for example, tea drinks (including those containing milk), green tea drinks, fruit juices, etc. Also, methods for the addition of flavors removed of microorganism by filtration, may include a method of charging into an aseptic tank where components other than flavors are retained after thermal sterilization, a method of direct addition into pre-sterilized containers, etc.

EXAMPLE 4

Figure 6:
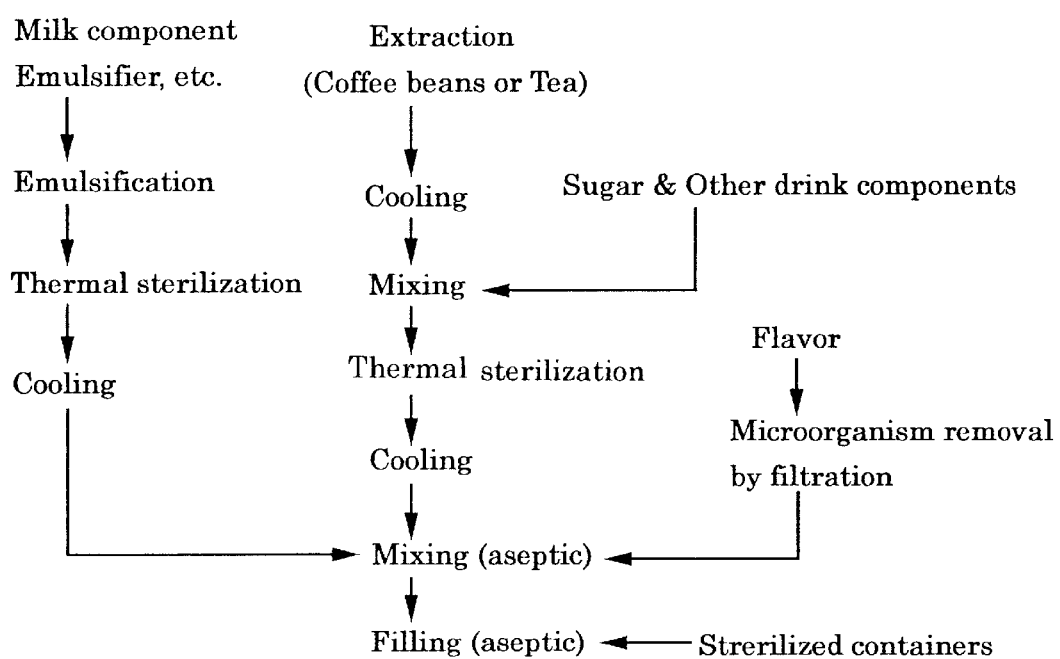
FIG. 6 is a flow diagram showing steps of a production process for milk-containing soft drinks according to Example 4 of the present invention.

In accordance with a production process as shown in FIG. 6, a coffee extract solution (coffee solids) was obtained after a known method, sugar and a pH adjusting agent were added according to the formula shown in Table 7, and a mixture obtained was subjected to sterilization at 131° C. for 30 seconds (to make a seventh drink component). Independently from the seventh drink component, a milk component containing an emulsifier, etc. was, after dissolution and emulsification, sterilized at 138° C. for 30 seconds (to make an eighth drink component). Moreover, a flavor component was independently removed of microorganism by filtration through a 0.45 $\mu$m diameter-sized filter (to make a ninth drink component).

Next, after the seventh, eighth and ninth components were formulated by mixing together in an aseptic tank, a mixture obtained was filled into pre-sterilized containers under aseptic conditions to obtain the drink.

TABLE 7

Formula Used for Coffee Drink Manufacture

| Coffee beans | 50.0 kg |
|---|---|
| (coffee solids | 12.5) |
| Sugar | 50.0 |
| pH adjusting agent | optional |

TABLE 7-continued

Formula Used for Coffee Drink Manufacture

Milk component

| | |
|---|---|
| Fresh milk | 80.0 kg |
| Emulsifier | 2.0 |
| Flavors | optional |
| Water | optional |
| Total | 1000.0 liters |
| | Brix 7.0% |
| | pH 6.50 |

COMPARATIVE EXAMPLE 5

Figure 7:
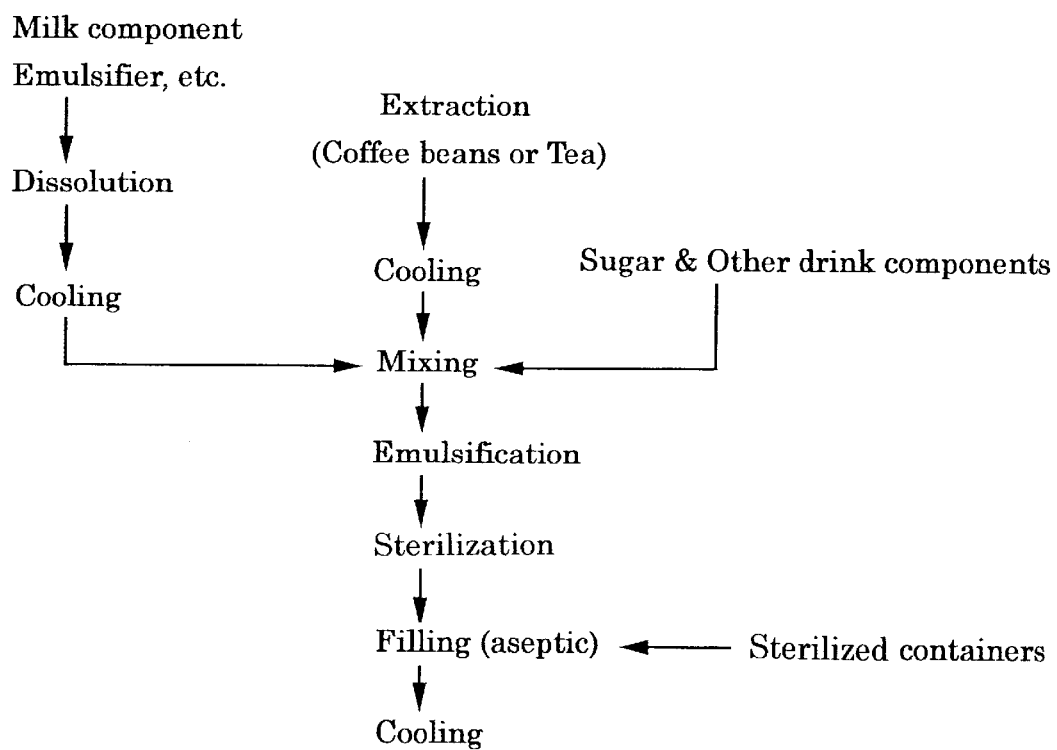
FIG. 7 is a flow diagram showing steps of a production process for milk-containing soft drinks according to Comparative Example 5 of prior art.

In accordance with a production process as shown in FIG. 7, a coffee extract solution (that is, coffee solids) was obtained after a known method, sugar, a pH adjusting agent, a milk component including an emulsifier, etc. and a flavor component were added according to the formula shown in Table 7 and formulated by mixing, and a mixture obtained was emulsified, subjected to sterilization at 131° C. for 30 seconds, and then filled into pre-sterilized containers under aseptic conditions to obtain the drink.

The drinks obtained in Example 4 and Comparative Example 5 were served to taste sampling by 10 panelists of coffee specialists, and the test resulted in a finding as shown in Table 8 that the drink obtained in Comparative Example 5 had lost more of the original flavor and taste of coffee a stronger flavor than the drink obtained in Example 4.

TABLE 8

Result of Taste Sampling

| | Average marks | |
|---|---|---|
| | Example 4 | Comparative Example 5 |
| Consolidated evaluation | 4.7 | 3.8 |
| Flavor | 4.9 | 3.0 |

TABLE 8-continued

Result of Taste Sampling

| | Average marks | |
|---|---|---|
| | Example 4 | Comparative Example 5 |
| Taste | 4.6 | 3.8 |
| Bitterness | 4.2 | 4.0 |
| Aftertaste | 4.5 | 4.2 |

Note (Marks): [Good] 5 ← → 0 [Bad]

We claim:

1. A production process for milk-containing soft drinks, comprising
    blending and emulsifying a milk component containing milk and an emulsifier to obtain a first drink component, sterilizing the first drink component at a high temperature under a first condition and cooling the same,
    obtaining a second drink component not containing the milk component, sterilizing the second drink component at a high temperature under a milder condition than the first condition and cooling the same,
    obtaining a third drink component containing a flavor which has been removed of microorganism by filtration, said flavor being different from the first and second drink components, and
    blending the cooled first drink component, the cooled second drink component, and the third drink component under aseptic conditions to produce milk-containing soft drink.

2. A production process for milk-containing soft drink according to claim 1, wherein the second drink component contains a liquid coffee extract.

3. A production process for milk-containing soft drink according to claim 1, wherein the second drink component contains a liquid black tea extract.

* * * * *